(12) United States Patent
Kihara et al.

(10) Patent No.: US 10,305,240 B2
(45) Date of Patent: May 28, 2019

(54) WIRE HARNESS, CONNECTION METHOD BETWEEN COVERED CONDUCTING WIRE AND TERMINAL, AND WIRE HARNESS STRUCTURE BODY

(71) Applicants: FURUKAWA ELECTRIC CO., LTD., Tokyo (JP); FURUKAWA AUTOMOTIVE SYSTEMS INC., Inukami-gun (JP); TOYOTA JIDOSHA KABUSHIKI KAISHA, Toyota-shi (JP)

(72) Inventors: Yasushi Kihara, Tokyo (JP); Yukihiro Kawamura, Inukami-gun (JP); Takashi Tonoike, Inukami-gun (JP); Takahito Nakashima, Okazaki (JP); Hiroshi Kobayashi, Okazaki (JP); Hiroyasu Taga, Toyota (JP)

(73) Assignees: FURUKAWA ELECTRIC CO., LTD., Tokyo (JP); FURUKAWA AUTOMOTIVE SYSTEMS INC., Inukami-gun (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 123 days.

(21) Appl. No.: 15/127,630

(22) PCT Filed: Mar. 20, 2015

(86) PCT No.: PCT/JP2015/058437
§ 371 (c)(1),
(2) Date: Sep. 20, 2016

(87) PCT Pub. No.: WO2015/146819
PCT Pub. Date: Oct. 1, 2015

(65) Prior Publication Data
US 2018/0175574 A1 Jun. 21, 2018

(30) Foreign Application Priority Data
Mar. 24, 2014 (JP) .................. 2014-059720

(51) Int. Cl.
*H01R 4/62* (2006.01)
*H01R 4/70* (2006.01)
(Continued)

(52) U.S. Cl.
CPC ..... *H01R 43/0488* (2013.01); *B60R 16/0215* (2013.01); *H01R 4/185* (2013.01);
(Continued)

(58) Field of Classification Search
CPC ...... H01R 43/0488; H01R 4/185; H01R 4/62; H01R 43/058; B60R 16/0215
(Continued)

(56) References Cited

U.S. PATENT DOCUMENTS 2,815,497 A * 12/1957 Redslob ........... H01R 4/62
174/90
7,306,495 B2 * 12/2007 Hashimoto ........ H01R 4/185
439/877

(Continued)

FOREIGN PATENT DOCUMENTS

CN 101286594 A 10/2008
CN 101394025 A 3/2009
(Continued)

OTHER PUBLICATIONS

Office Action dated Mar. 28, 2017 in Japanese Patent Application No. 2016-039234 (with unedited computer generated English translation).
(Continued)

*Primary Examiner* — Timothy Thompson
*Assistant Examiner* — Michael F McAllister
(74) *Attorney, Agent, or Firm* — Oblon, McClelland, Maier & Neustadt, L.L.P.

(57) ABSTRACT

Under compression by molds (31a, 31b), a wire (25), a covered area (27), and a crimping portion (5) are com-
(Continued)

pressed and their cross-sectional areas decrease. Here, A1 is the cross-sectional area of the wire (25) after compression. That is, A1 is the sum of the cross-sectional area of the each strand after compression. Also, 131 is the cross-sectional area of the covered area (27) after compression. In the present invention, the compression rate for the wire (25) is set between 50% and 80%. Also, the compression rate for the covered area (27) is set between 40% and 90%. The amount of compression by the molds (31*a*, 31*b*) is set so that the compression rates are within these ranges. In the present invention, the compression rate is calculated by: (cross-sectional area after compression)/(cross-sectional area before compression). That is, 80% compression rate means that the cross-sectional area has decreased by 20% due to compression. That is, the relationships of $80\% \geq (A1/A0) \geq 50\%$ and $90\% \geq (B1/B0) \geq 40\%$ are satisfied.

20 Claims, 10 Drawing Sheets

(51) Int. Cl.
  *H01R 43/058* (2006.01)
  *H01R 43/048* (2006.01)
  *H01R 4/18* (2006.01)
  *B60R 16/02* (2006.01)

(52) U.S. Cl.
  CPC ............ *H01R 4/62* (2013.01); *H01R 4/70* (2013.01); *H01R 43/058* (2013.01)

(58) Field of Classification Search
  USPC ................................................. 174/74 R
  See application file for complete search history.

(56) References Cited

U.S. PATENT DOCUMENTS

| | | | | |
|---|---|---|---|---|
| 7,775,842 | B2* | 8/2010 | Yamagami | H01R 43/058 439/877 |
| 8,771,015 | B2* | 7/2014 | Inoue | H01R 4/70 439/604 |
| 8,963,006 | B2* | 2/2015 | Kuwayama | H01R 4/185 174/113 A |
| 9,640,933 | B2* | 5/2017 | Kawamura | H01R 43/048 |
| 2002/0096352 | A1 | 7/2002 | Kuwayama et al. | |
| 2005/0026515 | A1* | 2/2005 | Hashimoto | H01R 4/185 439/877 |
| 2008/0172874 | A1 | 7/2008 | Yagi et al. | |
| 2008/0254673 | A1 | 10/2008 | Noda et al. | |
| 2010/0144189 | A1* | 6/2010 | Watanabe | H01R 4/185 439/421 |
| 2010/0261391 | A1* | 10/2010 | Ono | H01R 4/185 439/877 |
| 2011/0034091 | A1* | 2/2011 | Kobayashi | H01R 4/185 439/877 |
| 2013/0126235 | A1 | 5/2013 | Tanikawa et al. | |
| 2013/0175088 | A1* | 7/2013 | Itou | H01R 43/005 174/74 R |
| 2014/0106629 | A1* | 4/2014 | Matsushita | H01R 4/185 439/877 |
| 2014/0335745 | A1 | 11/2014 | Kawamura et al. | |
| 2014/0349501 | A1* | 11/2014 | Aizawa | H01R 4/72 439/190 |
| 2015/0079857 | A1 | 3/2015 | Kawamura et al. | |
| 2015/0126078 | A1 | 5/2015 | Kawamura et al. | |
| 2015/0180138 | A1* | 6/2015 | Ohnuma | H01R 4/62 174/84 C |
| 2017/0047668 | A1* | 2/2017 | Sato | H01R 4/185 |

FOREIGN PATENT DOCUMENTS

| | | |
|---|---|---|
| CN | 100481617 C | 4/2009 |
| CN | 102057537 A | 5/2011 |
| CN | 102084547 A | 6/2011 |
| CN | 102405558 A | 4/2012 |
| CN | 103069658 A | 4/2013 |
| CN | 103620871 A | 3/2014 |
| EP | 2 472 674 A1 | 7/2012 |
| EP | 2 876 730 A1 | 5/2015 |
| JP | 64-9361 U | 1/1989 |
| JP | 6-302341 A | 10/1994 |
| JP | 8-17544 A | 1/1996 |
| JP | 2002-216862 A | 8/2002 |
| JP | 2004-71437 A | 3/2004 |
| JP | 2004-111058 A | 4/2004 |
| JP | 2005-174896 A | 6/2005 |
| JP | 2006-331931 A | 12/2006 |
| JP | 2009-252712 A | 10/2009 |
| JP | 2009-272188 A | 11/2009 |
| JP | 2010-73930 A | 4/2010 |
| JP | 2010-205583 A | 9/2010 |
| JP | 2011-40194 A | 2/2011 |
| JP | 2011-65994 A | 3/2011 |
| JP | 2011-204582 A | 10/2011 |
| JP | 2011-210593 A | 10/2011 |
| JP | 2013-4409 A | 1/2013 |
| JP | 2016-129149 A | 7/2014 |
| JP | 2014-164958 A | 9/2014 |
| WO | WO 2011/122622 A1 | 10/2011 |
| WO | 2014/014103 A1 | 1/2014 |
| WO | WO 2014/010605 A1 | 1/2014 |
| WO | WO 2014/014104 A1 | 1/2014 |
| WO | WO 2014/129600 A1 | 8/2014 |

OTHER PUBLICATIONS

Office Action dated Jun. 13, 2017 in Korean Patent Application No. 10-2016-7022102 (with English translation).
Japanese Office Action dated Feb. 28, 2017 in Patent Application No. 2014-510294 (with English Abstract).
Office Action dated Nov. 1, 2016 in Japanese Patent Application No. 2016-039234 (with English language translation).
Extended European Search Report dated Sep. 22, 2017 in Patent Application No. 15769188.2.
Japanese Office Action dated Jan. 29, 2015 in Japanese Patent Application No. 2013-034050 (With English translation).
Japanese Office Action dated Apr. 15, 2015 in Japanese Patent Application No. 2013-034050 (With English translation).
International Search Report dated Jun. 16, 2015 in PCT/JP2015/058437 Filed Mar. 20, 2015.
Combined Office Action and Search Report dated Oct. 27, 2017 in Chinese Patent Application No. 201580006905.2 (with English translation).
Combined Office Action and Search Report dated Jul. 2, 2018 in Chinese Patent Application No. 201580006905.2 with English translation, 18 pages.
Office Action dated Nov. 2, 2018 in European Patent Application No. 15 769 188.2, 6 pages. (The references cited therein were previously filed.).
Office Action dated Dec. 29, 2018 in Chinese Patent Application No. 201580006905.2, citing document AO therein, with English-language translation, 18 pages.

\* cited by examiner

WIRE HARNESS, CONNECTION METHOD BETWEEN COVERED CONDUCTING WIRE AND TERMINAL, AND WIRE HARNESS STRUCTURE BODY

TECHNICAL FIELD OF THE INVENTION

This invention relates to a wire harness and the like that is used for motor vehicles, for example.

BACKGROUND OF THE INVENTION

Conventionally, crimp bonding, in which an electric wire is caulked and crimped by a terminal called open-barrel type, is usually used to connect an electric wire with a terminal in a wire harness for motor vehicles. In such a wire harness however, any moisture or the like attaching to the connection part of the electric wire and the terminal may cause progress of oxidization of the surface of a metal that is used for the electric wire and increase the resistance at the joint part. In addition, if different metals are used for the electric wire and the terminal, corrosion between different metals may progress. This progress of corrosion of the metal materials at the connection part causes cracks or contact failure at the connection part and its effect on product life is unavoidable. In recent years in particular, a wire harness having electrical wires made of aluminum alloy and terminals made of copper alloy has been in practical use, and the problem of corrosion at the joint part thereof has been noticed.

For instance, if moisture attaches to the contacting part of different metals, such as aluminum and copper, so-called electrolytic corrosion may occur due to difference in corrosion potential. Since the potential difference between aluminum and copper is large in particular, corrosion on the side of aluminum, which is an electrically base metal, progresses. Consequently, the connection between the conducting wires and crimp terminals becomes unstable, causing an increase in contact resistance or in electrical resistance due to decrease in wire diameters, and, furthermore, disconnection of the wires may occur which may result in malfunction or breakdown of the electrical components.

Disclosed is such a wire harness in which different metals are in contact with each other and resin material is filled to cover the connection parts of electrical wires and crimp terminals (Patent Document 1). Filling the resin material prevents moisture from attaching to the contact parts of electrical wires and crimp terminals.

RELATED ART

Patent Documents

[Patent Document 1] Japanese Unexamined Patent Application Publication No. 2004-111058 (JP-A-2004-111058)

SUMMARY OF THE INVENTION

Problems to be Solved by the Invention

However, the method of Patent Document 1 has a problem; since the resin material has to be filled separately, the manufacturing process is complicated and thus the management in the manufacturing process is also complicated. In addition, the cost of the whole wire harness is high due to the complication of the process.

The present invention was achieved in view of such problems. Its object is to provide a wire harness and the like that can have a reliable water stopping performance.

Means for Solving Problems

To achieve the above object, a first invention is a wire harness in which a covered wire (coated wire) and a terminal are connected. The terminal includes a crimping portion, in which the coated wire is crimped, and a terminal body. The crimping portion includes a covering crimping portion that crimps a covering portion and a wire crimping portion that crimps a wire exposed from the covering portion. Except for a part through which the coated wire is inserted, other parts of the crimping portion are sealed. The compression rate for the wire is between 50% and 80% and the compression rate for the covering portion is between 40% and 90% at the covering crimping portion.

It is further preferable that the compression rate for the covering portion is between 50% and 80%.

Preferably, the compression rate for the wire at the covering crimping portion is equal to or larger than the compression rate for the wire at the wire crimping portion.

Preferably, the longitudinal elasticity of resin forming the covering portion is in the range of 10 MPa to 500 MPa at 20° C.

Preferably, the thickness of the covering portion is in the range of 0.16 mm to 0.40 mm.

Preferably, the wire is made of pure aluminum.

Preferably, the wire is a twisted wire.

Preferably, the wire before crimping is an uncompressed conductor.

According to the first invention, the appropriate compression rates for the conducting portion of the terminal and the covering portion of the coated wire can yield a reliable water stopping performance. In particular, the covering portion is in a plastic deformation region and this allows the adhesion between the covering portion and the terminal to improve. In addition, the conducting portion is in the plastic deformation region and thus the conducting portion can be reliably crimped and held.

The compression rate for the wire at the covering crimping portion that is equal to or larger than the compression rate for the wire at the wire crimping portion (that is, the amount of compression of the wire at the wire crimping portion is larger than the amount of compression of the wire at the covering crimping portion) as above can improve a tension strength of the coated wire against the terminal. This is because the small compression rate for the wire at the covering crimping portion makes the area of a cross-section of the wire at the covering crimping portion smaller than that of the wire at the conductor crimping portion, and thus the coated wire may break due to stress concentration when being pulled.

Such effect is particularly effective if the longitudinal elasticity of the resin that forms the covering portion is in the range of 10 MPa to 500 MPa at 20° C. It is also particularly effective if the thickness of the covering portion is in the range of 0.16 mm to 0.40 mm.

In addition, the wire can be reliably deformed if the wire is made of pure aluminum, which has a low hardness and deforms easily under compression. In particular, the wire can be more easily deformed if the wire is a twisted wire, which has gaps between strands. Furthermore, the wire can be deformed more easily if the wire is an uncompressed conductor. Facilitating the deformation of the wire in these ways can increase the compression rate for the wire easily.

A second invention is a connection method between a coated wire and a terminal. The terminal includes a crimping portion, in which the coated wire is crimped, and a terminal body. The crimping portion includes a covering crimping portion that crimps a covering portion and a wire crimping portion that crimps a wire exposed from the covering portion. Except for a part through which the coated wire is inserted, other parts of the crimping portion are sealed. For crimping the crimping portion into which the coated wire is inserted, the compression rate for the wire is between 40% and 80% and the compression rate for the covering portion is between 40% and 90% at the covering crimping portion.

According to the second invention, a wire harness that is excellent in water stopping performance can be manufactured.

A third invention is a wire harness structure body in which a plurality of wire harnesses are bundled. The wire harness has a coated wire connected with a terminal. The terminal includes a crimping portion, in which the coated wire is crimped, and a terminal body. The crimping portion includes a covering crimping portion that crimps a covering portion and a wire crimping portion that crimps a wire exposed from the covering portion. Except for a part through which the coated wire is inserted, other parts of the crimping portion are sealed. The compression rate for the wire is between 40% and 80% and the compression rate for the covering portion is between 40% and 90% at the covering crimping portion.

A plurality of wire harnesses bundled together can be used in the present invention.

Effects of the Invention

The present invention can provide a wire harness and the like that can have a reliable water stopping performance.

BRIEF DESCRIPTION OF DRAWINGS

FIG. 2 (b) illustrates a wire harness 30.

FIG. 5 (b) is a cross sectional view showing the terminal 1 and the coated wire 23 after crimping.

FIG. 8 illustrates a wire harness 30a.

DETAILED DESCRIPTION OF THE PREFERRED EMBODIMENTS

First Embodiment

Figure 1:
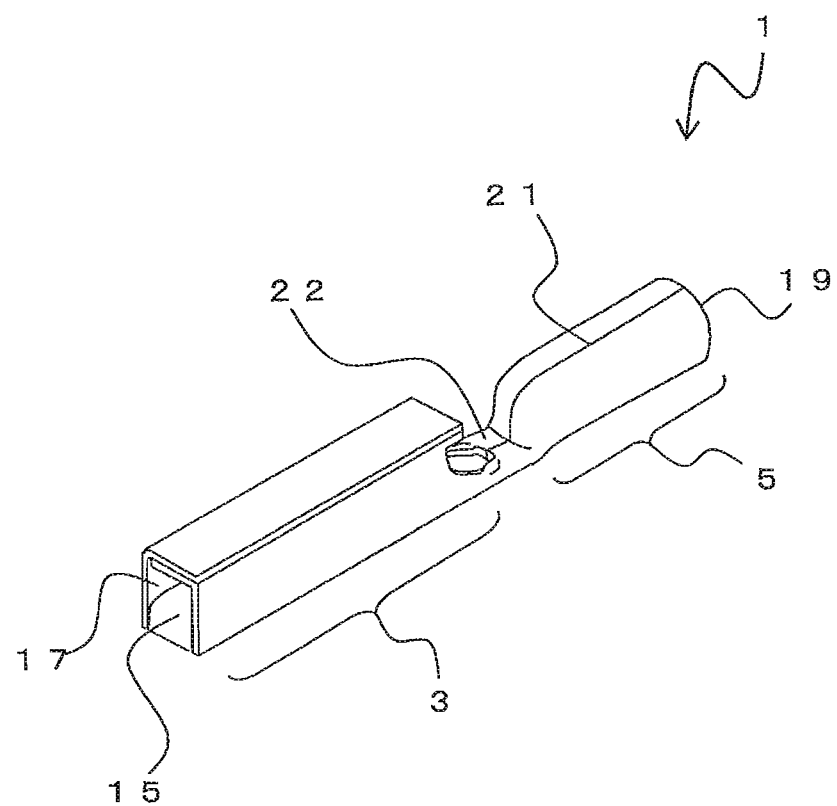
FIG. 1 is a perspective view showing a terminal 1.

Hereinafter, a first embodiment of the present invention will be described with reference to the accompanying drawings. As shown in FIG. 1, a terminal 1 includes a terminal body 3 and a crimping portion 5.

The terminal 1 is made of copper. The terminal body 3 is made of a predetermined-shaped plate material that is formed into a tube body having a rectangular cross section. The terminal body 3 has an elastic contacting piece 15, which is formed by folding the plate member into the rectangular tube body, at a front-end portion 17. The terminal body 3 is connected with, for example, a male terminal that is inserted into the front-end portion.

The crimping portion 5 is formed by being rolled up into a cylindrical body having a circular cross section with its side edges being butted to each other and joined at a joint portion 21 to be integrated. A coated wire described below is inserted into a rear-end portion 19 of the crimping portion 5, which is formed into a cylinder. In addition, a sealed portion 22 is provided at a front-end portion of the crimping portion 5 (on the side of the terminal body 3). That is, the crimping portion 5 is sealed except for the rearend portion 19 into which the coated wire is inserted. The joint portion 21 and the sealed portion 22 are welded by laser welding, for example.

Although the crimping portion 5 that is a cylinder having a uniform diameter is shown as an example, the present invention is not limited thereto. For example, the crimping portion 5 may have different diameters at the part in which the wire of the coated wire is crimped and at the part in which the covered portion is crimped. To be precise, the diameter of the part in which the covered portion is crimped may be larger than the diameter of the part in which the wire is crimped. In this case, a level difference is formed at the crimping portion 5 due to the diameter change.

Figure 2A:
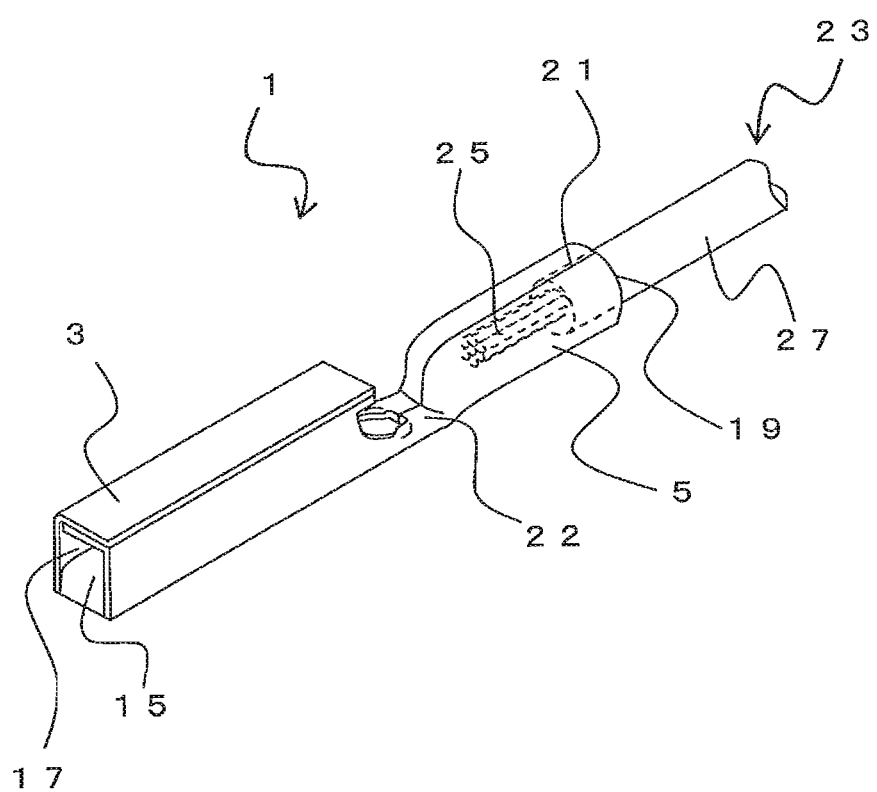
FIG. 2 (a) is a perspective view showing the terminal 1 and a coated wire 23 before crimping.
Figure 2B:
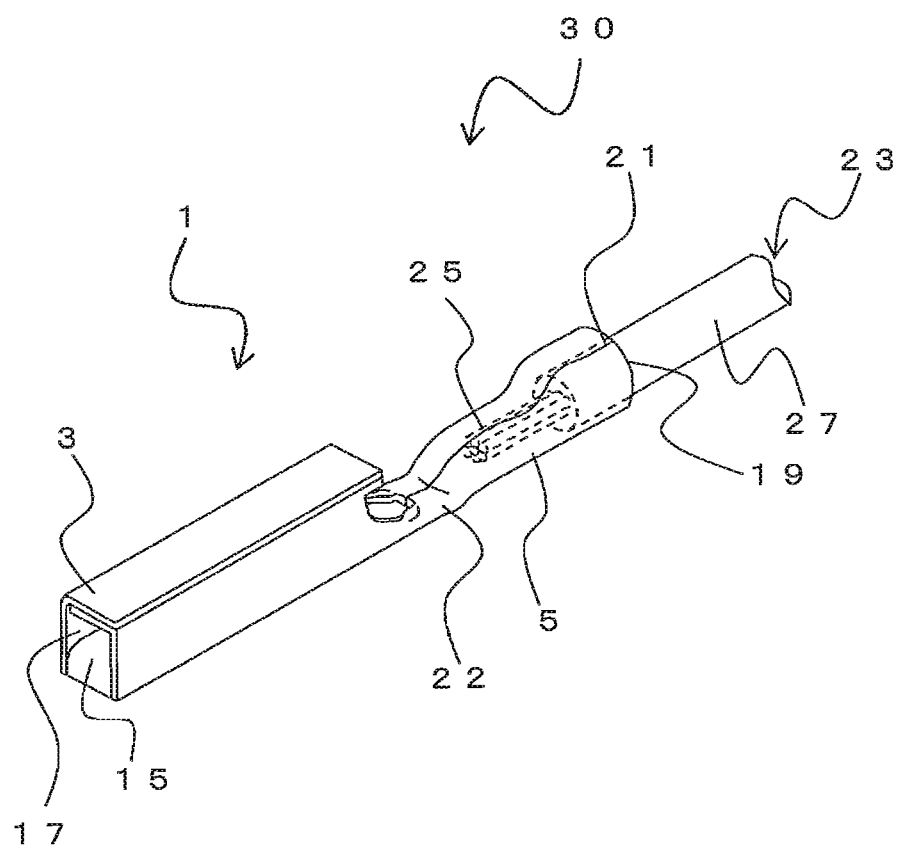

Next, a process of forming a wire harness will be described. FIG. 2 (a) and FIG. 2 (b) show a process of connecting the terminal 1 with a coated wire 23. First, as shown in FIG. 2 (a), the coated wire 23 is inserted into the cylindrical crimping portion 5. As mentioned above, the crimping portion 5 is rolled up into an approximately cylindrical shape and the edge parts are joined at the joint portion 21. In addition, the sealed portion 22 is provided at the front-end portion of the crimping portion 5 (on the side of the terminal body 3). That is, the crimping portion 5 is sealed except for the rear-end portion 19 into which the coated wire 23 is inserted.

The coated wire 23 includes a wire 25 that is covered by an insulating covered area 27. The wire 25 is made of aluminum based material for example, and pure aluminum, which has low hardness and excellent processability, is particularly preferable. When inserting the coated wire 23 into the crimping portion 5, a part of the covered area 27 at the tip of the coated wire 23 is peeled off to expose the wire 25. Preferably, the covered area 27 is made of polyvinyl chloride (PVC) or polyethylene, for example.

Next, molds compress the crimping portion 5 as shown in FIG. 2 (b). In this way, the crimping portion 5 is crimped together with the wire 25 and the covered area 27. Thus, the coated wire 23 is connected to the terminal 1 and a wire harness 30 is manufactured.

Figure 3:
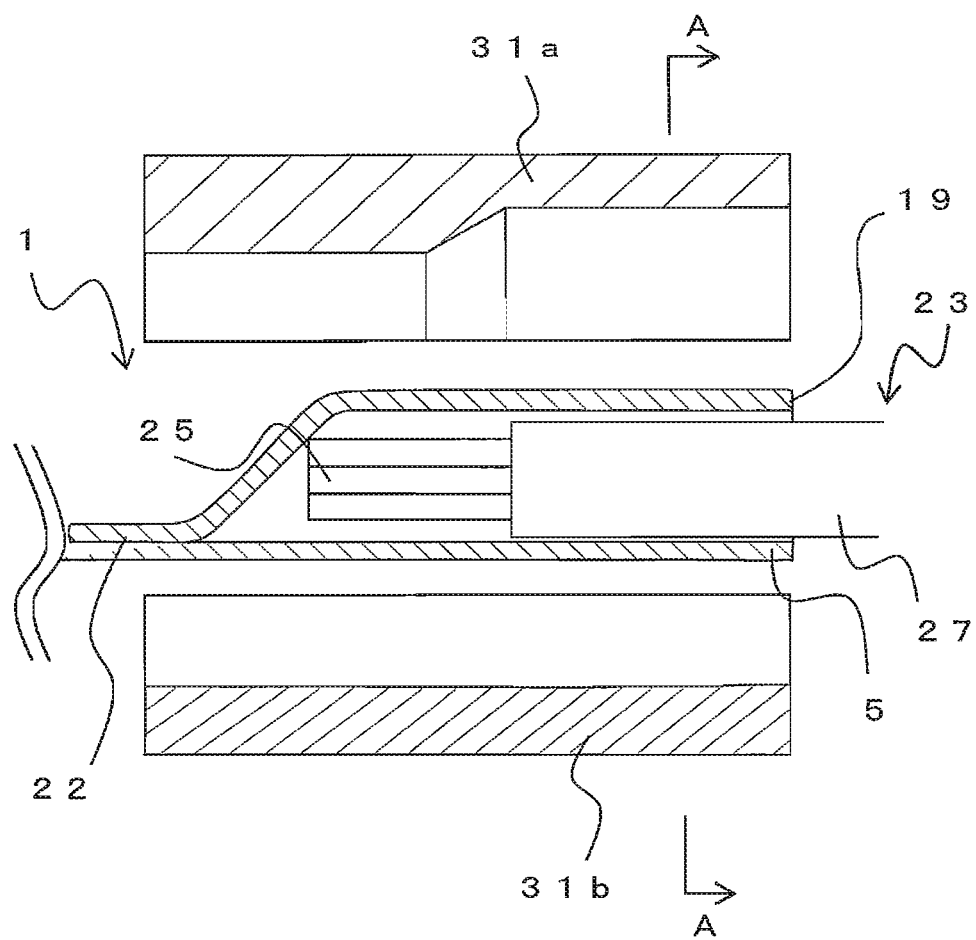
FIG. 3 is a cross sectional view showing the terminal 1 and the coated wire 23 that are arranged between the molds 31a and 31b.
Figure 4:
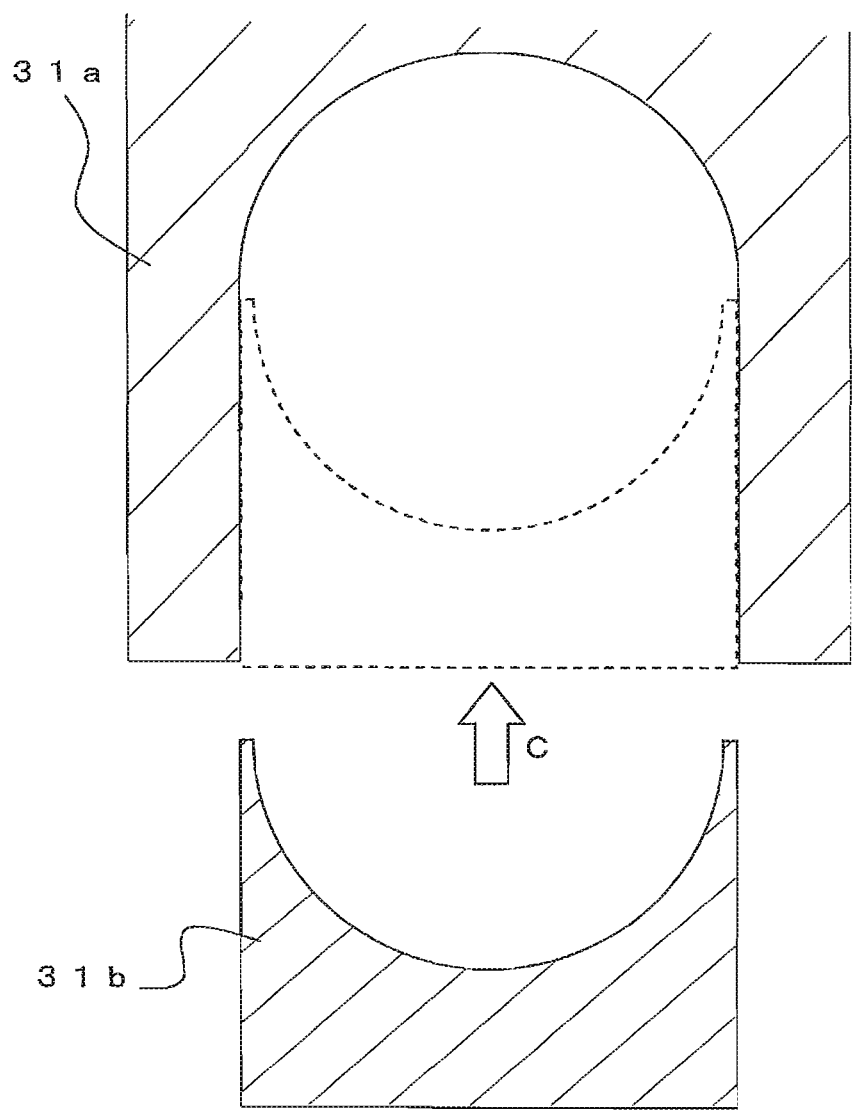
FIG. 4 is a cross sectional view showing the shapes of the molds 31a and 31b.

FIG. 3 is a cross sectional view in a longitudinal direction showing the terminal 1 and the coated wire 23 placed between the molds 31a and 31b. Also, FIG. 4 is a cross sectional view along A-A line of FIG. 3 showing the shapes of the molds 31a and 31b (illustrations of the terminals 1 and the others are omitted). The crimping portion 5 of the terminal 1 with the coated wire 23 inserted thereto is placed between the mold 31a and the mold 31b.

The crimping portion 5 includes a wire crimping portion, which crimps the wire 25 exposed from the covered area 27, and a covering crimping portion, which crimps the covered area 27. Detailed description on the wire crimping portion will be omitted in the present invention.

As shown in FIG. 4, the parts of the molds 31a and 31b that crimp the covered area 27 have approximately semicircular inner shapes, and thus an approximately circular compression shape can be obtained by fitting the mold 31a with the mold 31b (an arrow C in the drawing). That is, the terminal 1 (the crimping portion 5) and the covered area 27 (the coated wire 23) that are interposed between the molds 31a and 31b can be compressed into a shape having approximately circular cross sections.

Figure 5A:
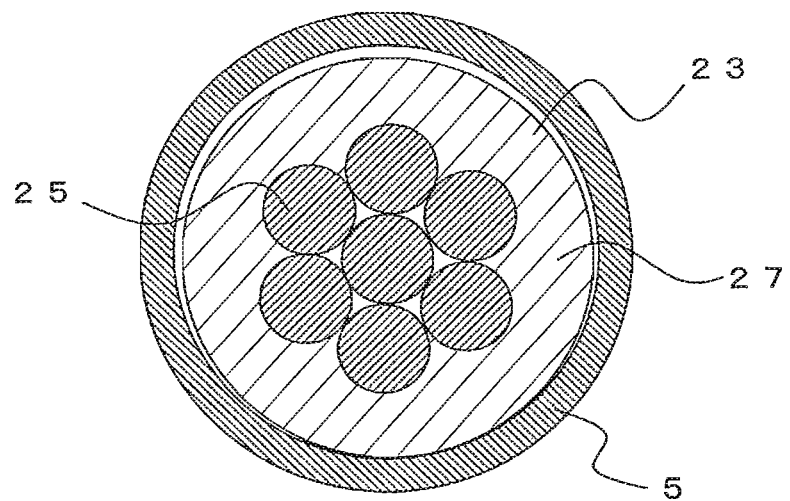
FIG. 5 (a) is a cross sectional view showing the terminal 1 and the coated wire 23 before crimping.
Figure 5B:
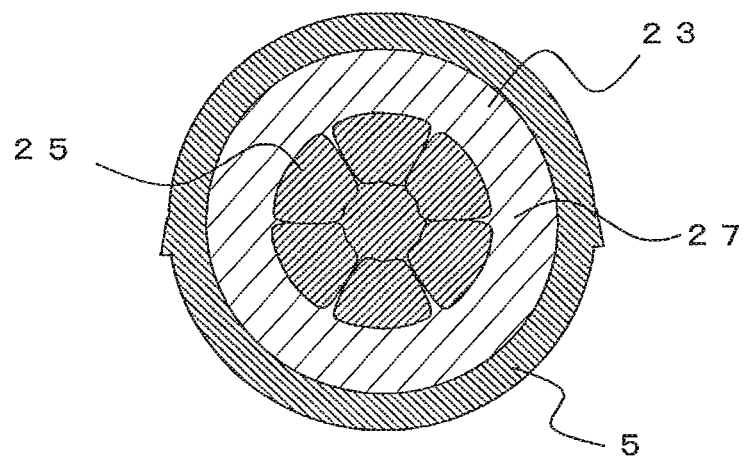

FIG. 5 (a) is a cross sectional view showing the state in which the coated wire 23 is inserted into the crimping portion 5 before crimping and FIG. 5 (b) is a cross sectional view showing the state in which the coated wire 23 is inserted into the crimping portion 5 after crimping. The cross sectional shape before crimping is compressed by the molds 31a and 31b into a compressed cross section of an approximately circular shape. In the examples shown in the drawings, the wire 25 is a twisted wire made of a plurality of strands and, also, each of the strands is an uncompressed conductor.

Here, a cross-sectional area of the wire 25 before crimping is A0. That is, the sum of the cross-sectional area of the each strand before crimping is A0. Also, a cross-sectional area of the covered area 27 before crimping is B0.

Under compression by the molds 31a and 31b, the wire 25, the covered area 27, and the crimping portion 5 are compressed and thus their cross-sectional areas decrease. Here, the cross-sectional area of the wire 25 after crimping is A1. That is, the sum of the cross-sectional area of the each strand after crimping is A1. Also, a cross-sectional area of the covered area 27 after crimping is B1. The cross-sectional area of the wire at the part that is not to be crimped is taken for the cross-sectional area before crimping, since the cross-sectional area of the wire 25 or the covered area 27 at the covering crimping portion before crimping is unknown.

In the present invention, the compression rate for the covering crimping portion of the wire 25 is set between 50% and 80%. Also, the compression rate for the covered area 27 is set between 40% and 90%. The amount of compression by the molds 31a and 31b is set so that the compression rates are within these ranges. Too small compression rate for the wire 25 may cause breaking of the wire 25. Also, too large compression rate for the wire 25 may cause entry of water, since gaps between the strands are large. Also, too small compression rate for the covered area 27 may cause breaking of the covered area 27 at a part on which stress is concentrated. Also, too large compression rate for the covered area 27 may cause water entry, since it is unable to obtain sufficient adhesion.

Here, the compression rate according to the present invention is calculated by (cross-sectional area after crimping)/(cross-sectional area before crimping). That is, the compression rate of 80% means that the cross-sectional area has decreased by 20% due to compression. That is, the relationships of $80\% \geq (A1/A0) \geq 50\%$ and $90\% \geq (B1/B0) \geq 40\%$ are satisfied in the present invention.

Usually, a twisted wire in which a plurality of strands are twisted is used for the wire 25. In such a case, each strand is arranged from the center in multiple layers; the periphery of the strand on the center side is surrounded by the other strands and the peripheral surfaces of the outermost strands are in contact with the covered area 27. On this occasion, all the strands may be compressed at a uniform rate, or, alternatively, the compression rate for the outermost strands may be smaller than the compression rate for the inner strands. In this way, the inner strands can be transformed into approximately regular hexagonal shapes for example, making adjacent strands to be in line contact with each other in the cross section, decreasing the gaps between the strands, and suppressing the leak along the gaps between the strands. In addition, since a curved part in the cross section remains on the peripheral surfaces of the outermost strands, the shape of the covered area 27 is almost the same as the shape before compression and the covered area 27 can be compressed uniformly. Thus, to make the compression rate for the outermost strands smaller than the compression rates for the other inner strands, the shapes of the molds, physical properties of the covered area 27, and the speed of deformation of caulking process at the time of crimping should be adjusted. For example, the process may be conducted with a transformation speed in a range of approximately 10 to 200/sec of the dynamic load.

Figure 6:
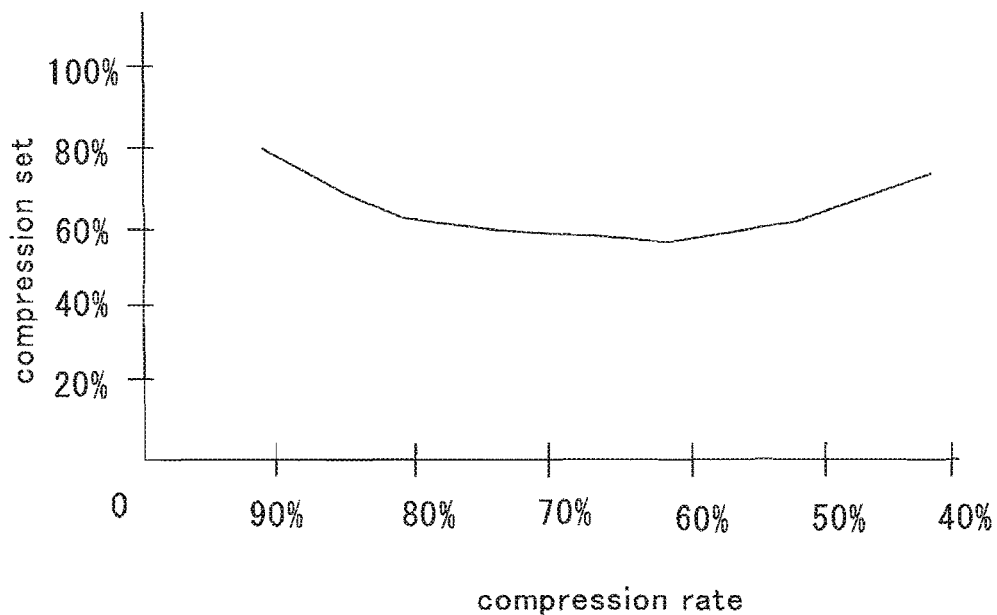
FIG. 6 is a graph showing a relationship between the compression rate and the compression set of resin.

FIG. 6 is a graph showing a relationship between the compression rate and the compression set of polyvinyl chloride. The compression set is calculated according to JIS K6262. That is, the compression set is calculated by the formula: $(t0-t2)/(t0-t1)$, where t0 is the original thickness of the specimen, t1 is the thickness of the specimen after compression (spacer thickness), and t2 is the thickness of the specimen that has been left for 30 minutes after being released from compression. The example in FIG. 6 shows the results obtained from compression applied at a temperature of 120° C. for 120 hours.

As shown in FIG. 6, for the compression rate in the range of 40% to 90%, the compression set is approximately 80%, which is less than 100%, showing that restoration occurs after release of compression. For the compression rate in the range of 50% to 80% in particular, the compression set is in a stable region, in which the compression set stays almost the same around the minimum value against the change in the compression rate. This is preferable since the stable repulsion force of the covering can be maintained, resulting in high water stopping performance.

Figure 7:
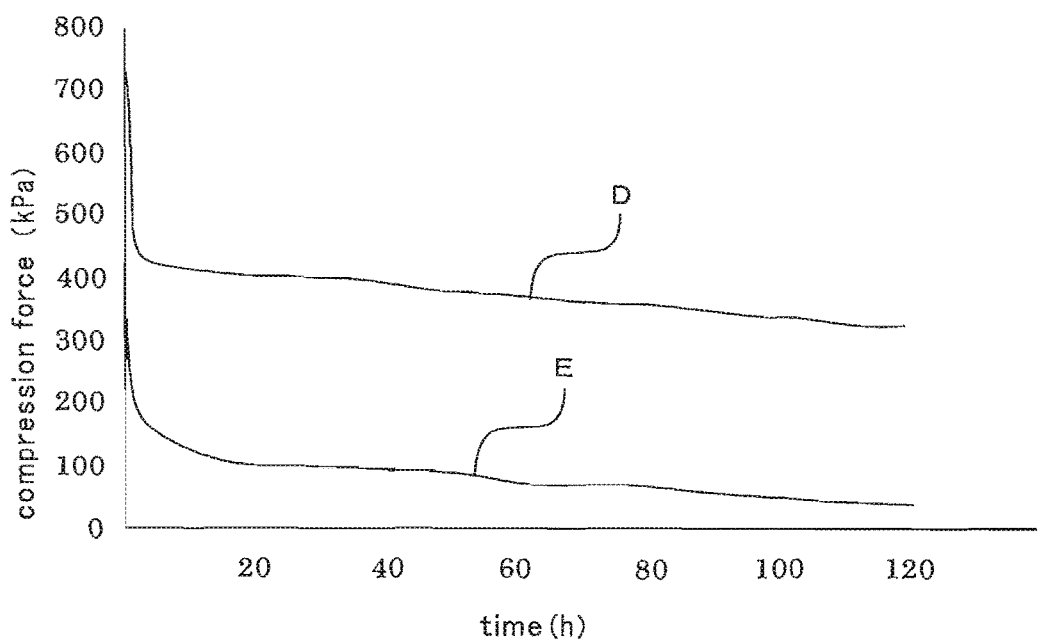
FIG. 7 is a profile of compression force versus retention time of the resin at high temperature.

FIG. 7 is a profile of compression force versus retention time of the similar resin, which is the covering material itself rolled out into a plate-like shape. D in the drawing is for the compression rate of 80% and E in the drawing is for the compression rate of 90%. The retention time is the time of retention at a temperature of 120° C.

As shown in the graph, for the compression rate of 80%, the compression force is maintained at 300 kPa or higher even after 120 hours at 120° C. On the other hand, for the compression rate of 90%, the stress is relaxed along with the retention time and decreases to approximately 50 kPa after 120 hours. The compression force of 50 kPa or lower increases the risk of leaking, since the pressure overcomes the compression force at the time of a leaking test under approximately 50 kPa. That is, if the covering material alone fails to have enough compression force, it means that the wire covering fails to keep enough surface pressure under compression. Usually, an electric wire and a terminal are crimped by caulking in a vertical direction (in one axial direction), creating a stress distribution. This allows leaking from the regions in which the compression stress is small, such as the side region of the electric wire, and thus the compression rate is required to be smaller than that in the test with the covering material alone. The results of the air-leaking test for the wire harness after crimping will be described later.

As described above, in the present invention, the compression force after retention can be maintained if the compression rate for the resin is in the range of 40% to 90%.

Similarly, if the compression rate for the wire 25 is less than 50%, the amount of deformation of the metal is too large and the wire may break. Meanwhile, if the compression rate for the wire is more than 80%, the amount of transformation is small and it is difficult to crush the entire wire in the plastic deformation region completely. Thus, the compression rate for the wire is also preferably in the range of 50% to 80%.

In the present invention, it is preferable that the compression rate for the wire 25 at the above-mentioned covering crimping portion is larger than or equal to the compression rate for the wire 25 at the wire crimping portion (that is, the amount of compression of the wire at the wire crimping portion is larger than the amount of compression of the wire at the covering crimping portion). Small compression rate for the wire 25 at the covering crimping portion decreases the cross-sectional area of the wire 25 compared with that at the conductor crimping portion, which may break when the coated wire 23 is pulled and stress concentration occurs. For this reason, the compression rate for the wire 25 at the covering crimping portion is made to be equal to or larger than the compression rate of the wire 25 at the wire crimping portion so that the tension strength of the coated wire 23 against the terminal 1 can be improved. Preferably, the compression rate for the wire 25 at the conductor crimping portion is approximately between 45% and 50%, for example.

After crimping under such conditions, the crimping portion 5 and the covered area 27 are adhered to each other with certainty and the crimping portion 5 can be sealed. In particular, the covered area 27 has moderate compression force left and the compression set is small. Thus, sufficient adhesion between the crimping portion 5 and the covered area 27 can be ensured. At this time, since the parts of the crimping portion 5 except for the rear-end portion 19 are sealed water-tightly by the joint portion 21 and the sealed portion 22, moisture can be prevented from entering into the crimping portion 5.

Thus, compressing with the compression rate between 50% and 80% for the wire 25 and the compression rate between 40% and 90% for the covered area 27 at the covering crimping portion (further preferably between 50% and 80%, or even more preferably between 50% and 70%) can apply appropriate amount of compression to both the wire 25 and the covered area 27 and improves the adhesion between thereof. Here, usually, the amount of compression of the covered area 27 is likely to be larger than that of the wire 25. However, if the wire 25 is a twisted wire for example, then the entire wire can be transformed easily because of the gaps between the strands. Thus, it is easy to increase the amount of compression of the wire 25.

Alternatively, a compressed wire in which the wire 25 is compressed in advance and then twisted is sometimes used as the coated wire. However, a compressed wire is already compressed before compression, and it is difficult to add further transformation thereto. For this reason, in the present invention, it is preferable that the wire 25 is an uncompressed conductor.

In addition, the resin forming the covered area 27 that has the longitudinal elasticity in the range of 10 MPa to 500 MPa at normal temperature (20° C.) can have a sufficiently high adhesion after crimping.

For example, if the above-mentioned longitudinal elasticity is less than 10 MPa, the resin is too soft and it is difficult to obtain reliable adhesion. Meanwhile, if the above-mentioned longitudinal elasticity exceeds 500 MPa, the resin is too hard and it is difficult to obtain reliable adhesion likewise. Thus, it is preferable that the longitudinal elasticity of the resin forming the covered area 27 is in the range of 10 MPa to 500 MPa at normal temperature (20° C.), or further preferably, in the range of 28 MPa to 420 MPa. As such a resin, polyvinyl chloride (PVC) or polyethylene is preferable, for example. The longitudinal elasticity can be calculated according to JIS-K7161 or 7162, for example.

In addition, the thickness of the covered area 27 is preferably in the range of 0.16 mm to 0.40 mm. If the thickness of the covered area 27 is too thin, the covered area 27 may break under compression with the compression rate within the above range. Meanwhile, if the covered area 27 is too thick, the amount of compression increases to obtain the compression rate within the above range. Thus, the thickness of the covered area 27 is preferably in the range of 0.16 mm to 0.40 mm.

The present embodiment has an appropriate compression rate for the covered area 27 so that the covered area 27 after compression can be transformed in the plastic transformation region. Also, on this occasion, the compression set of the covered area 27 is small. This allows the covered area 27 to have the compression force and thus to reliably have a high adhesion with the crimping portion 5. Consequently, the crimping portion 5 and the covered area 27 can have high water stopping performance.

In addition, the wire 25 may not break after compression because the compression rate for the wire 25 is appropriate. Also, the retaining force of the wire 25 is excellent because the wire 25 is transformed adequately.

Second Embodiment

Figure 8:
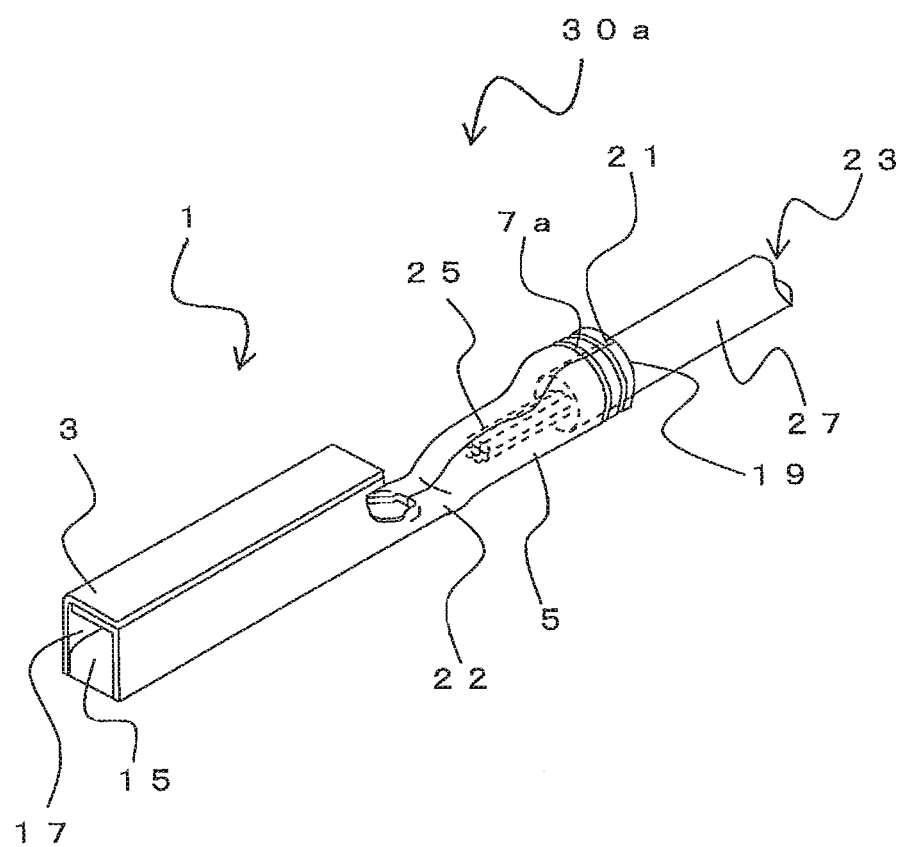
Figure 9:
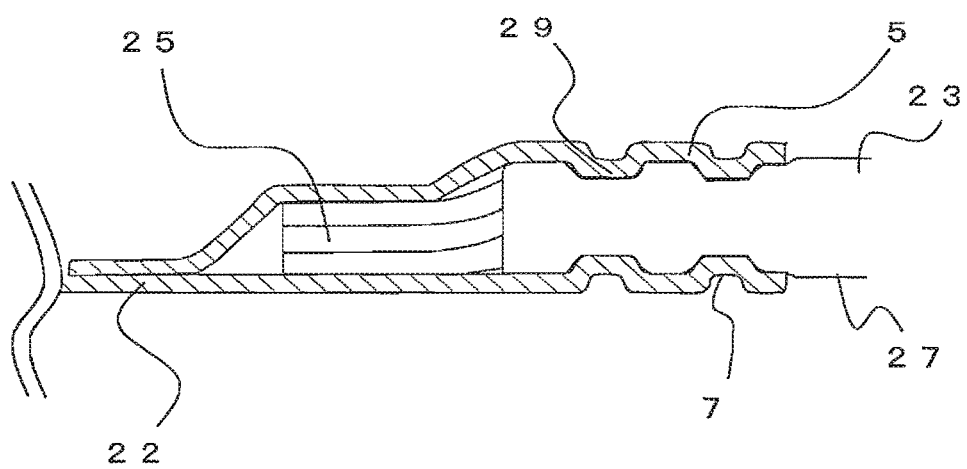
FIG. 9 is a cross sectional view of a crimping portion 5.

Next, a second embodiment will be described. FIG. 8 is a perspective view showing a wire harness 30a according to the second embodiment. FIG. 9 is a vertical cross sectional view of the crimping portion 5 of the wire harness 30a. Hereinafter, the same notations in the drawings such as FIG. 1 will be given to the structures having the same functions as the wire harness 30 and redundant descriptions will be omitted.

The wire harness 30a has a structure that is approximately similar to the wire harness 30, except that a convex streak 29 is formed on an inner surface of the crimping portion 5. The convex streak 29 is formed at the position of the covered area 27. Also, the convex streak 29 is formed in a ring shape that is continuous in a circumferential direction on the inner surface of the crimping portion 5. Any number of the convex streak 29 may be formed, but it is preferable that two or more rows of the convex streaks are formed with intervals in between.

The convex streaks 29 are formed, for example, at the time of crimping. For example, protrusions formed on the inner surface of the molds can push parts of the crimping portion 5 inward. Consequently, concave grooves 7 are formed on the outer surface of the convex streaks 29. In this way, the convex streaks 29 compresses the covered area 27 harder than the other parts so that the adhesion between the covered area 27 and the crimping portion 5 can be ensured with more certainty.

If the convex streaks 29 are formed as above, the compression rate of the convex streaks 29 is in the above-mentioned range on the cross section thereof. In this way, the covered area 27 can have reliable water stopping performance and the wire 25 can be retained with certainty.

According to the second embodiment, the same effects as in the first embodiment can be obtained. In addition, higher water stopping performance can be obtained by the convex streaks 29.

Working Examples

Next, a performance test on test samples will be described below; a test sample of a wire harness according to the present invention and another sample of a comparative wire harness are made and each sample was tested for its performance.

The wire harness 30, in which a coated wire having the characteristics shown in FIG. 6 was used and the crimping portion 5 was crimped under the each condition, was left for 120 hours at a high temperature of 120° C. before being sprayed with salt water for 48 hours under the regulations of salt spray testing JIS C60068-2-11.

The change in resistance before and after the test was 1 mΩ or more for the compression rate of 95%. On the other hand, there was very little change in resistance, 0.5 mΩ or less, for the compression rate in the range of 40% to 90%. For the compression rate of 35%, damage was found in the electric wire.

Figure 10:
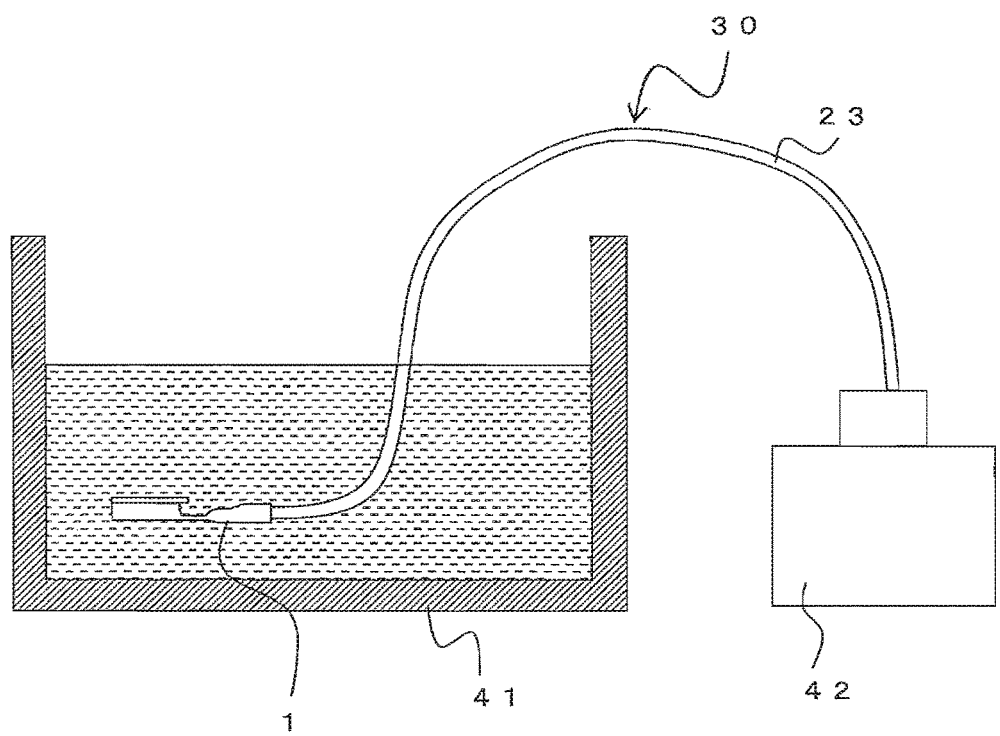
FIG. 10 is a schematic view showing a testing apparatus.

Next, similarly as above, the wire harness 30, in which a coated wire having the characteristics shown in FIG. 6 was used and the crimping portion 5 was crimped under the each condition, was left for 120 hours at 120° C. before air was supplied from the coated wire toward the terminal to test whether air leaks from the rear end portion. FIG. 10 shows an outline of the method of the experiment. In the experiment, the terminal 1 crimped with the coated wire 23 was placed into a water tank 41 containing water and pressured air was supplied by a regulator 42 as required from the end portion of the wire harness 30 toward the terminal 1.

The test was carried out at three levels of 3 kPa, 30 kPa, and 50 kPa. As for the level of 3 kPa, the terminal was sunk 30 cm deep in the water to obtain 3 kPa condition without using the regulator 42. The results are shown in Table 1.

The test was carried out 10 times (n=10) for each condition. If there were one or more leaks found, the result was marked as 'BAD'. If there was no leak found, the result was marked as 'GOOD'.

According to Table 1, no leak was found at 3 kPa for the samples No. 5, 7-16, and 18, which satisfy the conditions in which the compression rate for the covering portion at the covering crimping portion is between 40% and 90% and the compression rate for the wire at the covering crimping portion is between 50% and 80%. In addition, no leak was found even at 30 kPa for the samples No. 7-16, which satisfy the conditions in which the compression rate for the covering portion at the covering crimping portion is between 50% and 80% and the compression rate for the wire at the covering crimping portion is between 50% and 80%. Furthermore, no leak was found even at 50 kPa for the samples No. 7-13, which satisfy the conditions in which the compression rate for the covering portion at the covering crimping portion is between 50% and 70% and the compression rate for the wire at the covering crimping portion is between 50% and 80%.

Although the embodiments of the present invention have been described referring to the attached drawings, the technical scope of the present invention is not limited to the embodiments described above. It is obvious that persons skilled in the art can think out various examples of changes or modifications within the scope of the technical idea disclosed in the claims, and it will be understood that they naturally belong to the technical scope of the present invention.

For example, although aluminum (including inevitable elements) is used for the electric wire in the above embodiments, it is not limited thereto and copper may be used for the electric wire. Also, needless to say, any of the above-mentioned embodiments in the present invention can be combined with each other.

Also, a plurality of wire harnesses according to the present invention can be bundled together to be used. In the

TABLE 1

|   | Compression rate for the covering portion at the covering crimping portion | Compression rate for the wire at the covering crimping portion | 3 kPa Leak Test after being left for 120 hrs at 120° C. | 30 kPa Leak Test after being left for 120 hrs at 120° C. | 50 kPa Leak Test after being left for 120 hrs at 120° C. |
|---|---|---|---|---|---|
| 1 | 35% | 35% | BAD | BAD | BAD |
| 2 |  | 40% | BAD | BAD | BAD |
| 3 | 40% | 35% | BAD | BAD | BAD |
| 4 |  | 40% | BAD | BAD | BAD |
| 5 |  | 50% | GOOD | BAD | BAD |
| 6 | 50% | 40% | BAD | BAD | BAD |
| 7 |  | 50% | GOOD | GOOD | GOOD |
| 8 |  | 60% | GOOD | GOOD | GOOD |
| 9 | 60% | 50% | GOOD | GOOD | GOOD |
| 10 |  | 60% | GOOD | GOOD | GOOD |
| 11 |  | 70% | GOOD | GOOD | GOOD |
| 12 | 70% | 60% | GOOD | GOOD | GOOD |
| 13 |  | 70% | GOOD | GOOD | GOOD |
| 14 |  | 80% | GOOD | GOOD | BAD |
| 15 | 80% | 70% | GOOD | GOOD | BAD |
| 16 |  | 80% | GOOD | GOOD | BAD |
| 17 |  | 90% | BAD | BAD | BAD |
| 18 | 90% | 80% | GOOD | BAD | BAD |
| 19 |  | 90% | BAD | BAD | BAD |
| 20 |  | 95% | BAD | BAD | BAD |
| 21 | 95% | 90% | BAD | BAD | BAD |
| 22 |  | 95% | BAD | BAD | BAD | present invention, a structure in which a plurality of wire harnesses are bundled together is called a wire harness structure body.

DESCRIPTION OF NOTATIONS

1 ... terminal
3 ... terminal body
5 ... crimping portion
7 ... concave groove
15 ... elastic contacting piece
17 ... front-end portion
19 ... rear-end portion
21 ... joint portion
22 ... sealed portion
23 ... coated wire
25 ... wire
27 ... covered area
29 ... convex streak
30, 30a ... wire harness
31a, 31b ... mold
41 ... water tank
42 ... regulator

What is claimed is:

1. A wire harness in which a coated wire is connected with a terminal, wherein
the terminal comprises a crimping portion, in which the coated wire is crimped, and a terminal body;
the crimping portion includes a covering crimping portion that crimps a covering portion and a wire crimping portion that crimps a wire exposed from the covering portion and except for a part through which the coated wire is inserted, other parts of the crimping portion are sealed; and
a compression rate for the wire at the covering crimping portion is between 50% and 80% and a compression rate for the covering portion at the covering crimping portion is between 40% and 90%.

2. The wire harness according to claim 1, wherein the compression rate for the covering portion is between 50% and 80%.

3. The wire harness according to claim 1, wherein the compression rate for the wire at the covering crimping portion is equal to or larger than a compression rate for the wire at the wire crimping portion.

4. The wire harness according to claim 1, wherein a longitudinal elasticity ratio of resin forming the covering portion is between 10 MPa to 500 MPa at 20° C.

5. The wire harness according to claim 1, wherein a thickness of the covering portion is between 0.16 mm to 0.40 mm.

6. The wire harness according to claim 1, wherein the wire is made of pure aluminum.

7. The wire harness according to claim 1, wherein the wire is a twisted wire.

8. The wire harness according to claim 1, wherein the wire before crimping is an uncompressed conductor.

9. A connection method between a coated wire and a terminal, wherein
the terminal comprises a crimping portion, in which the coated wire is crimped, and a terminal body;
the crimping portion includes a covering crimping portion that crimps a covering portion and a wire crimping portion that crimps a wire exposed from the covering portion and except for a part through which the coated wire is inserted, other parts of the crimping portion are sealed; and
the method comprising crimping the crimping portion into which the coated wire is inserted, a compression rate for the wire at the covering crimping portion being between 40% and 80% and a compression rate for the covering portion at the covering crimping portion being between 40% and 90%.

10. A wire harness structure body in which a plurality of wire harnesses are bundled, wherein
the wire harness has a coated wire connected with a terminal;
the terminal comprises a crimping portion, in which the coated wire is crimped, and a terminal body;
the crimping portion includes a covering crimping portion that crimps a covering portion and a wire crimping portion that crimps a wire exposed from the covering portion and except for a part through which the coated wire is inserted, other parts of the crimping portion are sealed; and
a compression rate for the wire at the covering crimping portion is between 40% and 80% and a compressing rate for the covering portion at the covering crimping portion is between 40% and 90%.

11. The wire harness according to claim 1, wherein the terminal is made of copper.

12. The wire harness according to claim 1, wherein the crimping portion is cylindrical with a circular cross section.

13. The wire harness according to claim 12, wherein a diameter of the circular cross section of the crimping portion is constant along an entire length of the crimping portion.

14. The wire harness according to claim 12, wherein a diameter of the circular cross section of the crimping portion varies along a length of the crimping portion.

15. The wire harness according to claim 12, wherein a diameter of the cross section of the crimping portion in the covering crimping portion differs from a diameter of the cross section of the crimping portion in the wire crimping portion.

16. The wire harness according to claim 15, wherein the diameter of the cross section of the crimping portion in the covering crimping portion is larger than the diameter of the cross section of the crimping portion in the wire crimping portion.

17. The wire harness according to claim 1, wherein the covering crimping portion includes at least one convex streak to compress the covering portion with more force than other parts of the covering crimping portion that do not have the at least one convex streak.

18. The wire harness according to claim 17, wherein the at least one convex string is formed as a ring around a circumference of the covering crimping portion.

19. The method according to claim 9, wherein the crimping is performed with molds that shape the crimping portion of the terminal.

20. The method according to claim 19, further comprising forming at least one convex streak in the covering crimping portion using at least one protrusion in the molds.

* * * * *